United States Patent [19]

Schwagerman

[11] 4,385,197
[45] May 24, 1983

[54] MULTIPOINT THERMOCOUPLE ASSEMBLY

[75] Inventor: William H. Schwagerman, Spring Grove, Ill.

[73] Assignee: Pneumo Corporation, Boston, Mass.

[21] Appl. No.: 308,260

[22] Filed: Oct. 5, 1981

Related U.S. Application Data

[63] Continuation-in-part of Ser. No. 210,516, Nov. 28, 1980, abandoned.

[51] Int. Cl.³ .......................... G01K 7/04; H01L 35/02
[52] U.S. Cl. ..................................... 136/221; 136/230; 374/110; 374/208
[58] Field of Search ............... 136/221, 230, 231, 232; 73/341, 349; 374/110, 208

[56] References Cited

U.S. PATENT DOCUMENTS

| | | | |
|---|---|---|---|
| 3,015,234 | 1/1962 | Springfield | 73/339 |
| 3,174,342 | 3/1965 | Werner et al. | 73/362 AR |
| 3,240,069 | 3/1966 | Kennedy | 73/341 X |
| 3,263,502 | 8/1966 | Springfield | 136/221 |
| 3,533,288 | 10/1970 | Franck | 136/221 |
| 3,535,165 | 10/1970 | Webb | 136/233 X |
| 3,637,438 | 1/1972 | Springfield | 136/230 |
| 3,874,232 | 4/1975 | Hardison | 73/342 X |
| 3,901,080 | 8/1975 | Hilborn | 73/359 R |
| 3,907,606 | 9/1975 | Chang | 136/233 |
| 3,939,012 | 2/1976 | Williams | 136/221 |
| 3,955,419 | 5/1976 | Barton et al. | 73/340 |
| 4,044,612 | 8/1977 | Powell | 73/341 |
| 4,098,122 | 7/1978 | Landman et al. | 73/341 |

OTHER PUBLICATIONS

Page from Thermo–Electric Co. Catalog on Industrial Thermocouples.
Page 11 from Claud S. Gordon, (Catalog Section 3a) on Multipoint Thermocouple Assemblies.
Page from Maveric Industries Catalog 400, Copyright 1971, on Multipoint Thermocouples.
Two Pages from Gay Engineering & Sales Co., Inc., Catalog on Multipoint Thermocouple Assemblies.

*Primary Examiner*—Daniel M. Yasich
*Attorney, Agent, or Firm*—Maky, Renner, Otto & Boisselle

[57] ABSTRACT

A multipoint thermocouple assembly for monitoring temperatures at various locations, for example, at different depths in a process vessel, includes a plurality of thermocouples, a protective tube well having a hollow interior, elongate guides in the protective well for guiding respective thermocouples along the interior of the protective well, and wedges in the guides at respective axial locations along the protective well for urging the measuring junctions of respective thermocouples into thermal transfer contact with the wall of the well. In one form of the invention, the guides may comprise plural channels on the exterior surface of an elongated support member, formed as by attaching fins or dividers to such exterior surface, or by providing a plurality of splines on such exterior surface. In another form of the invention, a plurality of elongated thin walled guide tubes are brazed or welded to the exterior surface of a plurality of longitudinally spaced support rings. The guide tubes have openings in the outer walls thereof at the respective points of thermocouple measuring junction locations, and wedges in the tubes at such points for urging the measuring junctions out through the openings at such points. The well when inserted in a process vessel protects the thermocouple measuring junctions while positioning them simultaneously to sense temperature at different respective locations or depths in the vessel. The invention also relates to methods for making a multipoint thermocouple assembly and for replacing a thermocouple therein.

39 Claims, 7 Drawing Figures

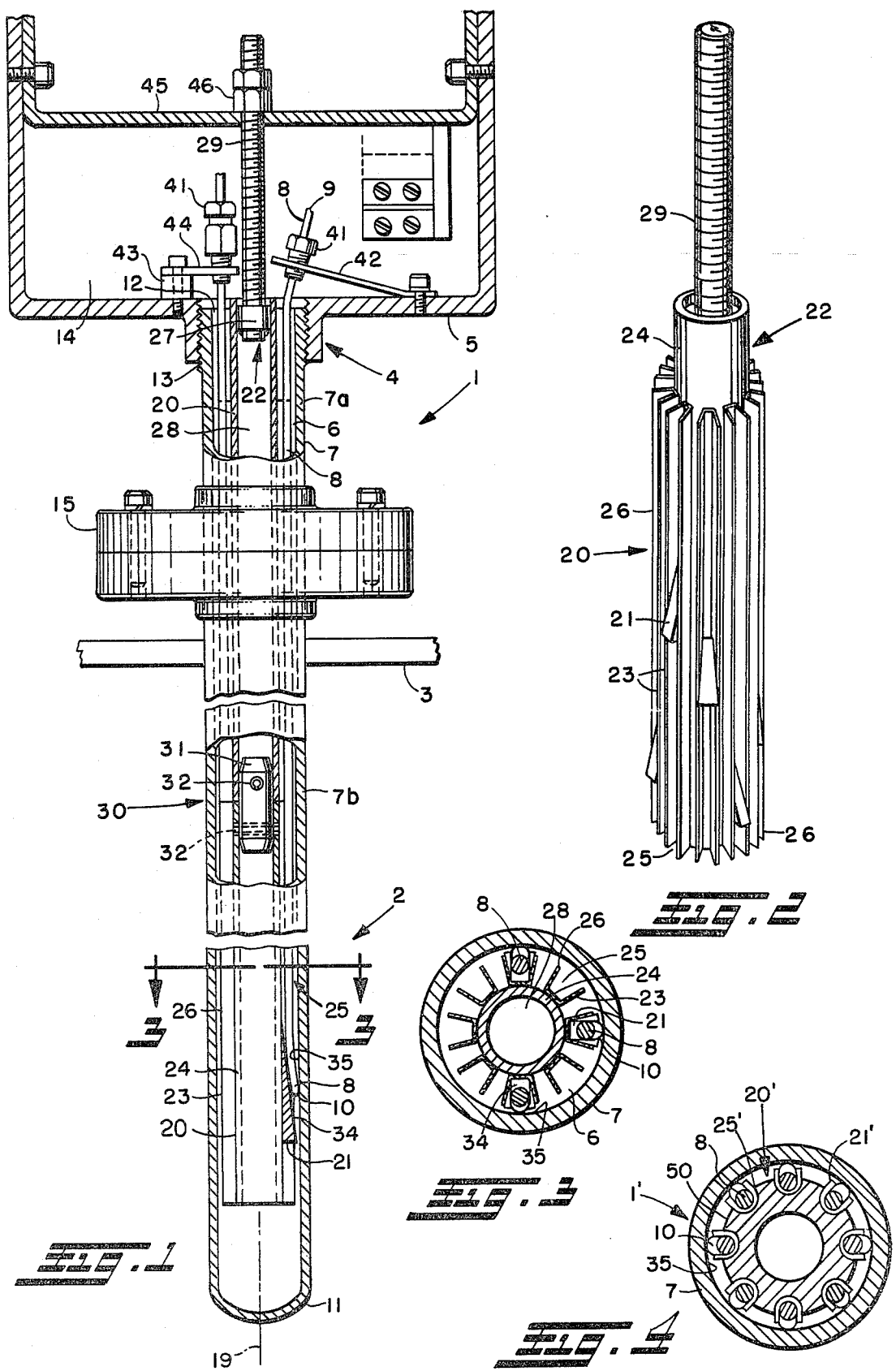

MULTIPOINT THERMOCOUPLE ASSEMBLY

CROSS-REFERENCE TO RELATED APPLICATIONS

This application is a continuation-in-part of U.S. application Ser. No. 210,516, filed Nov. 28, 1980, now abandoned.

BACKGROUND

The present invention relates generally to thermocouples and more particularly to multipoint thermocouple assemblies.

Multipoint thermocouple assemblies have been used in the past, for example, to obtain information concerning the temperature occurring at different depths or heights in a utilization environment, such as a cracking tower or other process vessel, or the like. Such multipoint thermocouple assemblies may have a length from a few feet to in excess of 100 feet and are inserted into such process vessel.

A typical prior thermocouple assembly includes several thermocouples, each having its measuring junction at a different location along the length of the assembly, and some means is provided to bundle together the thermocouples and to direct their terminating ends to a common junction box for effecting electrical connections to measuring equipment. Usually the measuring junctions and portions of the leads of the thermocouples are contained in a protective tube well that effects such bundling and isolates the thermocouples from the external ambient environment, which may contain corrosives or other material that may affect the thermocouple, for example. Ideally the measuring junctions are held in thermal energy transfer contact with the inside wall of such a protective tube well, and such well preferably is of good thermally conductive material so that the thermocouple measuring junctions essentially sense the temperature directly outside of the wall portion of the protective tube well with which they are in contact.

In such typical prior multipoint thermocouple assemblies the thermocouples are fixed in the assembly, i.e. they are securely attached to a support within the well or to the wall of the well by permanent means. As a result, individual thermocouples cannot be removed individually for examination, testing, and/or replacement. Rather, in order to repair or to replace only a single thermocouple in a multipoint thermocouple assembly, it has been necessary in the past to remove the entire multipoint thermocouple assembly from the process vessel, for example. While such assembly is removed from the process vessel, the temperature sensing data ordinarily provided thereby is lost until it or a substitute thermocouple assembly has been inserted back into the process vessel.

SUMMARY

In accordance with the present invention, the individual thermocouples of a multipoint thermocouple assembly can be selectively inserted into a protective tube-like well, as desired, and such thermocouples can be individually removed and replaced without removing the well from a utilization environment and, accordingly, without eliminating the temperature sensing operation of the other thermocouples of the overall assembly. Also in accordance with the invention, novel means is provided to obtain contact of the measuring junctions with the interior wall of the protective well, especially without interfering with the thermocouple removability feature.

One aspect of the present invention relates to a multipoint thermocouple assembly including plural thermocouples, a hollow tube well, elongate guides in the well for guiding the thermocouples along the well as they are inserted therein, and wedge or ramp-like obstructions in respective guide channels or tubes for urging or forcing the measuring junctions of respective thermocouples into thermally conductive contact with respective wall portions of the tube well. When guide tubes are utilized as the elongate guides, openings must be provided in the outer walls thereof at the respective points of thermocouple measuring junction locations.

Another aspect of the invention relates to a multipoint thermocouple mounting assembly including a hollow tube well, elongate guides in the well for guiding the thermocouples along the well as they are inserted therein, and wedge or ramp-like obstructions in respective guide channels or tubes for urging or forcing the measuring junctions of respective thermocouples into thermally conductive contact with respective interior wall portions of the tube well.

Another aspect of the invention relates to a method of making a multipoint thermocouple assembly including inserting plural thermocouples in respective guide tubes or channels formed by a divider or splines on the exterior surface of a support member in a tube-like well to engage respective wedge-like stops in the guide tubes or channels, and urging such thermocouples along the wedge-like stops to cause the latter to urge the measuring junctions of respective thermocouples into contact with the tube-like well structure.

Additionally, an aspect of the invention relates to a method of replacing a thermocouple in a multipoint thermocouple assembly in which plural thermocouples in respective channels or tubes in the protective tube-like well have measuring junctions in contact with respective wall portions of such well, including withdrawing a thermocouple from one channel or tube, inserting a thermocouple in such channel or tube to engage a wedge-like stop therein, and urging such inserted thermocouple along such wedge-like stop to cause the latter to urge the measuring junction of the thermocouple into contact with the interior wall of the well.

With the foregoing in mind, primary objects of the invention are to provide a multipoint thermocouple assembly and methods of making and repairing the same that are improved in the noted respects.

Another object is to facilitate the making of a multipoint thermocouple assembly.

An additional object is to facilitate the replacing of a thermocouple in a multipoint thermocouple assembly.

A further object is to enable replacement of a thermocouple in a multipoint thermocouple assembly without removing the entire assembly from its environment of utilization.

Still another object is to obtain secure thermally conductive contact of a thermocouple measuring junction with a portion of a wall of a protective tube-like well structure and especially to facilitate the obtaining of such contact.

Still an additional object is to improve the versatility of a multipoint thermocouple assembly, for example, by enabling common parts to be used in assemblies of a variety of lengths.

Still a further object is to enable the addition or deletion of thermocouples from a multipoint thermocouple assembly and especially to effect the same while the thermocouple assembly is positioned in a utilization environment.

These and other objects and advantages of the present invention will become more apparent as the following description proceeds.

To the accomplishment of the foregoing and related ends, the invention, then, comprises the features hereinafter fully described and particularly pointed out in the claims, the following description and the annexed drawings setting forth in detail a preferred embodiment of the invention and an alternate embodiment of the invention, these being indicative, however, of but several of the various ways in which the principles of the invention may be employed.

BRIEF DESCRIPTION OF THE DRAWINGS

In the annexed drawings:

FIG. 1 is an elevation view, partially broken away in section, of one form of multipoint thermocouple assembly according to the present invention;

FIG. 2 is a three dimensional view of one form of channel spacer member used in the multipoint thermocouple assembly of FIG. 1;

FIG. 3 is a section view through a lower portion of the multipoint thermocouple assembly of FIG. 1 taken on the plane of the line 3—3 thereof;

FIG. 4 is a section view similar to that of FIG. 3 illustrating a splined channel spacer member for a modified multipoint thermocouple assembly;

DESCRIPTION OF THE PREFERRED EMBODIMENT

Figure 5:
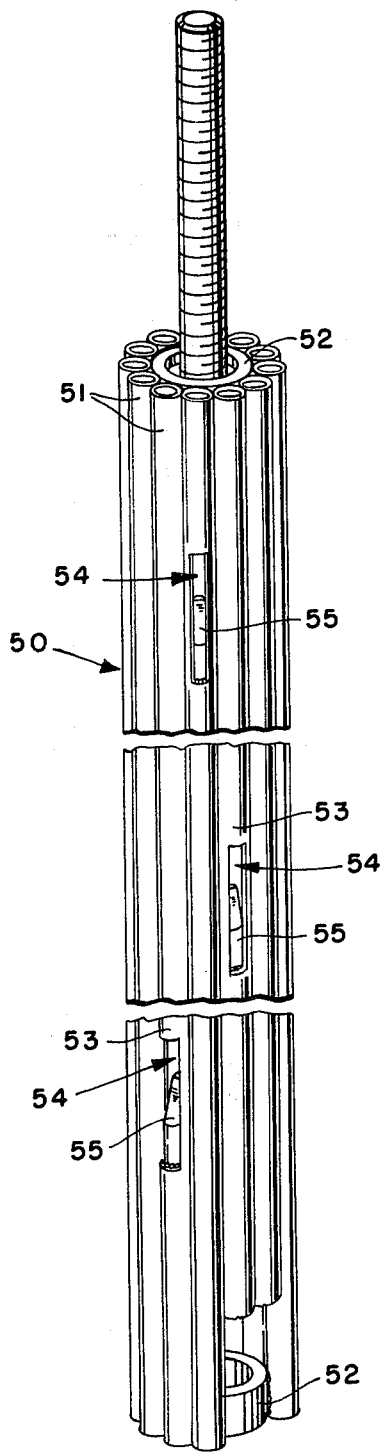
FIG. 5 is a three dimensional view of still another form of spacer member for use in place of the channel spacer member of FIG. 1 or 4.

Referring now in detail to the drawing, and initially to FIG. 1, a multipoint thermocouple assembly in accordance with the present invention is generally indicated at 1. The assembly 1 has a sensing end 2 insertable, for example, into a process vessel 3, only part of the top of which is shown, for obtaining information concerning the temperature at various depths in the vessel. A terminating end 4 of the assembly 1 is exposed outside of the vessel and may include a junction box 5 through which access to the hollow interior 6 of a protective tube-like well structure 7 is provided. Plural thermocouples 8 may be individually inserted into and/or removed from the well 7 via the junction box 5, and the junction box also provides a protected area for connecting the terminating ends 9 of the thermocouples to a conventional terminal connector block or the like. The connector block facilitates connecting the individual thermocouples to conventional electrical means for obtaining temperature information from the respective thermocouples in the usual manner.

The well 7 preferably is formed of good thermally conductive material so that the temperature of the environment outside thereof will be effectively transmitted through to the thermocouple measuring junctions 10 in the well. As illustrated, the well 7 is of elongate tubular form having a closed bottom end 11 to protect the thermocouples 8 in the interior 6 when the sensing end 2 of the assembly 1 is inserted into a utilization environment and an open top end 12 leading into the junction box 5. The well may be connected to the junction box 5 as by a threaded connection 13. Flange connections 15 may also be provided at the ends of tubular well sections to permit coupling together of plural hollow tube-like sections 7a, 7b to form a well 7 of virtually any desired length.

Located within the well interior 6 is a channel spacer member 20 also shown in FIGS. 2 and 3. The channel spacer member 20 may be, for example, a conventional finned heat exchanger tube modified to include a plurality of inclined planes, ramps or wedge terminations or stops 21 and a mounting assembly 22. The stops 21 slope in a direction radially outwardly from the well axis and member 20 travelling in the direction of insertion of a thermocouple, e.g. a downward direction relative to the illustration of FIG. 1. Fins 23 extend outwardly and axially relative to the hollow tube 24 of the channel spacer member 20 to form individual axially extending channels 25 along a substantial portion of the length of tube. The fins may be attached to the tube 24 or may be integrally formed therewith. The channels 25 provide areas through which the respective thermocouples 8 may be inserted into the well 7 guiding the thermocouples along the well interior 6 parallel to the well axis while also separating the individual thermocouples from each other, as is seen most clearly in FIGS. 1 and 3. The channels 25 and particularly the radially remote edges 26 of the fins 23 also space the member 20 in the well 7 approximately coaxially with the elongate axis 19 thereof.

The mounting assembly 22 includes a threaded coupling sleeve 27 soldered or welded into the hollow interior 28 of the channel spacer member 20 and a threaded mounting stud or rod 29 threaded into the sleeve 27. The rod 29 protrudes from the upper end of the channel spacer member 20 into the junction box 5 to provide a support connection for the member 20 to the junction box independently of the threaded connection 13 of the well 7. Therefore, the member 20 may be moved independently of the well 7 and, if desired, may be removed entirely from the well via the junction box while leaving the well and junction box connection 13 intact and the well still positioned in the utilization environment.

A plurality of channel spacer members 20 may be connected axially in series, for example, as shown at 30 in FIG. 1. The uppermost channel spacer member 20 includes a mounting assembly 22 and the one or more additional channel spacer members are serially connected to the uppermost channel spacer member at the respective bottom and top ends. For example, an internal plug 31 may be used to attach the respective tube 24 sections by respective pins 32 which pass through the plug and at least part of the respective tube walls. Since the plug 31 is inside the tube 24 sections and the pins 32 preferably terminate within the tube 24 walls, the connection mechanism 30 will not interfere with the open continuity of the channels 25. Thus, not only can the well 7 be extended by connecting a plurality of tubular well sections together, for example, using the flange connections 15, but also a plurality of channel spacer members 20 may be connected together, thus allowing the multipoint thermocouple assembly 1 to have virtually any desired length.

To complete the assembly 1, a channel spacer member 20 of desired length is inserted into a well 7 also of desired length. The stops 21 are located at axial positions or depths at which thermocouple measuring junctions are intended to sense temperatures, for example, in the process vessel 3. Plural thermocouples 8 may be inserted into the open top end 12 of the well 7 urging the measuring junctions 10 thereof along respective channels 25 until each such measuring junction reaches or engages a respective stop 21. A further urging of each thermocouple into its channel causes the measuring junction 10 thereof to slide along at least a portion of the sloping surface 34 of the intercepting stop 21 which forces the measuring junction into firm contact with the adjacent interior wall 35 of the well 7 in thermally conductive engagement with such wall portion 35. When thus assembled, each measuring junction 10 will be at the temperature of the proximate environment directly outside its wall portion 35 of the well 7, and provides electrical signals that may be sensed by electrical equipment coupled to each of the terminating ends 9 thereof.

A suitable locking mechanism 41, such as a conventional turning type lock, may be provided near the terminating end 9 of each thermocouple 8 in the junction box 5 for positionally locking the thermocouple relative to a support 42 that is secured to a wall of the junction box. The support 42 may be a cantilever type support that resiliently applies a force to the thermocouple generally tending to urge the measuring junction 10 along the stop surface 34 for continued optimum engagement with the interior wall 35 of the well. Alternatively, a rigid spacer 43 and support arm 44 may be used to hold the locking mechanism 41 in position as shown.

The channel spacer member 20 may be supported within well 7 by a mounting plate 45 secured in the junction box 5. The mounting rod 29 passes through an opening in the mounting plate and is attached thereto as by a lock nut arrangement 46 as shown in FIG. 1. Each thermocouple 6 may be inserted through a respective locking mechanism 41 and down through a respective channel 25 until secure wedging of the measuring junction 10 is achieved, as aforesaid. After the thermocouples are so positioned, the locking mechanisms 41 may be tightened to prevent longitudinal movement of the thermocouples therein and more particularly relative to the supports 42, 44. Then, the lock nut arrangement 46 may be tightened on the rod 29 tending to draw the channel spacer member 20 upward in the well 7 for common axial movement relative to the thermocouples for effecting a further simultaneous wedging of all the measuring junctions 10 and security of contact thereof with the respective wall portions 35 of the well 7.

It will be appreciated that the upward and downward directional extents mentioned herein are used to facilitate description of the invention. However, such directional references are used by way of examples only, and it will be appreciated that the assembly 1 may be positioned for use with the well 7 extending horizontally, vertically in the opposite direction from that illustrated in FIG. 1, or in any other angular orientation, as desired. Moreover, the number of thermocouples used in the assembly 1 may be varied, as desired, and the locations of the respective stops 21 may be chosen as desired. Also, the sloped surface stops 21 may be replaced by other stops, e.g. tapered channels or the like, that effect the desired stopping and wedging effect to urge the measuring junctions 10 into contact with the well 7 while still permitting removal of the thermocouples from the well.

To remove and/or to replace a given thermocouple 8, the locking mechanism 41 associated therewith is first loosened and the thermocouple withdrawn from its channel 25 while the well 7 and remaining thermocouples 8 therein remain in place in the process vessel or the like. Thereafter, the same thermocouple, if not defective, for example, or a replacement thermocouple may be inserted back into the channel from which the original had been removed. After such placement, the locking mechanism 41 may be retightened. If desired, appropriate adjustment of the lock nut arrangement 46 may be effected during such removal and/or replacement procedure.

DESCRIPTION OF THE ALTERNATE EMBODIMENTS

Referring briefly to FIG. 4, wherein primed reference numerals designate parts corresponding generally in form and/or function to those designated above by unprimed reference numerals, a modified assembly 1' includes a modified channel spacer member 20' of spline configuration. The member 20' in the well 7 has a plurality of splines 50, which form the individual channels 25' as aforesaid for receiving, separating and guiding thermocouples 8 in the well. Stops 21' located at selected axial locations in channels 25' effect the wedging contact of respective measuring ends 10 of the thermocouples 8 with the interior wall portions 35 of the hollow well 7. The member 20' may have a threaded internal passage near its upper end for attachment to a lock nut arrangement 46 of the type illustrated in FIG. 1, for example, to provide the aforesaid functions.

Figure 6:
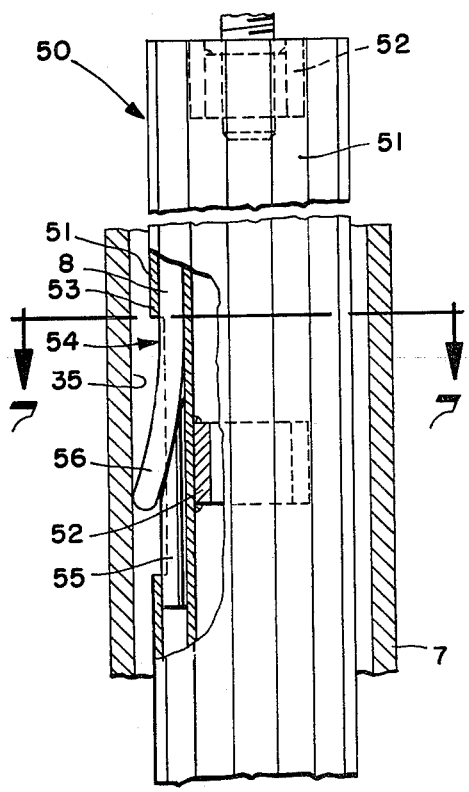
FIG. 6 is an enlarged fragmentary side elevation view of a portion of the spacer member of FIG. 5 shown inserted within an outer protective well.
Figure 7:
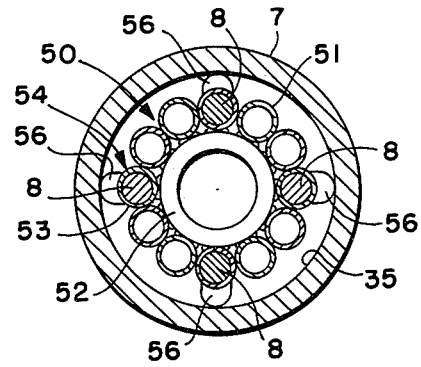
FIG. 7 is a transverse section through the spacer member and well of FIG. 6.

In FIGS. 5 through 7 there is shown still another form of spacer member 50 in accordance with this invention which may be used in place of either of the channel spacer members 20 and 20' of the FIGS. 1 and 4 embodiments. The spacer member 50 utilizes, in lieu of channels, any number of thin walled guide tubes 51 for receipt of the thermocouples 8 therein. As will be apparent, the guide tubes 51 have an inner diameter slightly greater than the outer diameter of the thermocouples so as to permit unobstructed movement of the thermocouples within the guide tubes during insertion and removal therefrom. The guide tubes are desirably held in a circular array by attaching the tubes at longitudinally spaced points to a plurality of longitudinally spaced support rings 52 as by brazing or welding.

At the intended points of thermocouple measuring junction locations, the outermost portions of the tube walls 53 are removed to provide openings 54 therein, and wedge shape members 55 similar to those used in the channel spacer members 20 and 20' are brazed or otherwise secured within the inner diameter of the tubes at such openings. Accordingly, when the respective thermocouple 8, which is inserted into the tube 51 from the upper open end thereof, reaches the point of the opening 54 in the tube, the thermocouple measuring junction end portion 56 of the thermocouple is forced outwardly by the wedge member 55 and through the opening in the tube into engagement with the interior wall 35 of the outer protective well 7 as before.

The number and location of the support rings 52 used to support the tubes 51 may vary depending on the size and length of tubes as well as the particular installation in which they are to be utilized. However, preferably a support ring is provided at each junction point as well as every five feet minimum and at both ends of the spacer member. The spacer member may also be made in one piece in any length up to the maximum restriction imposed by any common carrier, and two or more such spacer members may be connected together in a manner for example similar to that shown in FIG. 1, if desired, to obtain virtually any desired overall length.

In a typical installation, a clearance space of approximately 1/16" should desirably be provided between the interior wall 35 of the well 7 and the adjacent outer surface of the guide tubes when the spacer member 50 is inserted within the well as shown in FIGS. 6 and 7. The spacer member may be supported within the well by a mounting assembly and lock nut arrangement similar to that shown and described in connection with the FIG. 1 embodiment. When thus installed, any desired number of thermocouples may be inserted into the open upper ends of the respective guide tubes until the measuring junctions 56 thereof engage the wedges 55 and are urged outwardly into thermal transfer contact with the interior wall of the well.

The spacer member 50 of FIGS. 5–7 has the advantage that it is much lighter than the spacer members 20 and 20' of the FIGS. 1 and 4 embodiments. Also, such spacer member is less costly and easier to fabricate, and more readily lends itself to being made in one piece of any dsired length. However, in each case the basic principles of operation of each spacer member in the overall assembly are substantially the same.

In view of the foregoing it will be appreciated that a multipoint thermocouple assembly in accordance with the present invention may be manufactured with facility, has versatility in length and number of thermocouples included, and is capable of examination and/or replacement of thermocouples thereof without removing the overall assembly from its operational environment.

I claim:

1. A multipoint thermocouple assembly, comprising a plurality of thermocouples having measuring junctions, a well having a hollow interior, guide means for guiding plural thermocouples inserted into said well along at least a portion of said hollow interior, and means on the guide means for urging the measuring junctions of said thermocouples into thermally conductive engagement with respective wall portions of said well to sense the temperature thereof for temperature measuring purposes when said thermocouples are inserted into said assembly, said guide means comprising an elongate tube and plural fin means on said tube for spacing said guide means in said well and for forming axial guide channels extending parallel with the axis of said well, said guide channels guiding respective thermocouples inserted therein and separating respective thermocouples from each other.

2. A multipoint thermocouple assembly, comprising a plurality of thermocouples having measuring junctions, a well having a hollow interior, guide means for guiding plural thermocouples inserted into said well along at least a portion of said hollow interior, and means on the guide means for urging the measuring junctions of said thermocouples into thermally conductive engagement with respective wall portions of said well to sense the temperature thereof for temperature measuring purposes when said thermocouples are inserted into said assembly, said guide means comprising an elongate spline tube having guide channels in a surface thereof extending parallel with the axis of said well, said guide channels guiding respective thermocouples inserted therein and separating respective thermocouples from each other.

3. A multipoint thermocouple assembly, comprising a plurality of thermocouples having measuring junctions, a well having a hollow interior, guide means for guiding plural thermocouples inserted into said well along at least a portion of said hollow interior, means for urging the measuring junctions of said thermocouples into thermally conductive engagement with respective wall portins of said well to sense the temperature thereof when said thermocouples are inserted into said assembly, a junction box having a hollow interior portion for receiving terminal ends of respective thermocouples, means for connecting said well to said box, said well having a closed measuring end at which temperatures are sensed by measuring junctions of thermocouples and an open end opening into the interior of said box to permit thermocouples to be inserted into and removed from said well through said box, said well including an axially elongate tube having said measuring end at one end thereof, said guide means being positioned in said tube and including plural guide channels in said tube for guiding respective thermocouples inserted therein and for separating respective thermocouples from each other, said means for urging comprising sloped surfaces in respective channels at different axial locations relative to said tube, means for mounting said tube to said box, and means for independently mounting said guide means to said box, said means for independently mounting including means for moving said guide means relative to said tube in a direction to effect wedging of thermocouple measuring junctions into firm engagment with respective wall portions of said tube.

4. A multipoint thermocouple assembly, comprising a well having a hollow interior, a plurality of thermocouples inserted in said well and having measuring junctions, guide means including plural axially elongate guideways in said well for guiding respective thermocouples along at least a portion of said hollow interior during insertion of said thermocouples in said guideways in said well, and means in said guideways for intercepting and urging said measuring junctions of said thermocouples into thermally conductive engagement with respective wall portions of said well during insertion of said thermocouples in said guideways in said well to sense the temperature thereof.

5. The assembly of claim 4, said means for intercepting and urging comprising plural sloped surfaces positioned in respective guideways for wedging respective measuring ends of said thermocouples into contact with said wall portions of said well during insertion of said thermocouples in said guideways.

6. The assembly of claim 4, wherein said guideways are in the form of axially elongate guide channels, said guide channels separating respective thermocouples from each other.

7. The assembly of claim 6, further comprising means for attaching together in elongate series relation plural guide means while maintaining the open continuity of said guide channels thereof.

8. The assembly of claim 6, further comprising a junction box having a hollow interior portion for receiving terminal ends of respective thermocouples, means for connecting said well to said box, said well having a closed measuring end at which temperatures are sensed by measuring junctions of thermocouples and an open end opening into the interior of said box to permit thermocouples to be inserted into and removed from said well through said box.

9. The assembly of claim 6, said well comprising an axially elongate tube having a closed measuring end positionable in a utilization environment for sensing of temperature in the latter by respective thermocouples, and said means for intercepting and urging comprising plural sloped surfaces positioned in respective channels at different axially displaced positions for wedging respective measuring junctions of thermocouples into contact with respective axially spaced wall portions of said elongate tube.

10. The assembly of claim 9, further comprising mounting means for mounting said guide means and said well while permitting relative movement therebetween, and means for effecting relative movement between said guide means and said well simultaneously to wedge the measuring junctions of plural thermocouples into engagement with respective wall portions of said well.

11. The assembly of claim 10, further comprising means for holding thermocouples in fixed position relative to said well, and wherein said means for effecting relative movement comprises means for moving said guide means axially in said well.

12. The assembly of claim 11, said means for holding comprising means for resiliently urging measuring junctions of thermocouples axially along said well in a direction towards said means for intercepting and urging.

13. The assembly of claim 4, wherein said guideways are formed by guide tubes in said well, said guide tubes separating respective thermocouples from each other and having openings in the outer walls thereof at the desired points of thermocouple measuring junction locations, and said means for intercepting and urging comprising sloped surfaces positioned in said guide tubes at said openings for wedging respective measuring ends of thermocouples into contact with said wall portions of said well.

14. The assembly of claim 13, wherein said guide tubes are secured together in a circular array.

15. The assembly of claim 13, wherein said means for urging comprises wedges secured within said guide tubes at such desired points of thermocouple measuring junction locations.

16. The assembly of claim 13, wherein there are a plurality of longitudinally spaced support rings centrally of said guide tubes, said guide tubes being secured to the exterior surface of said support rings.

17. The assembly of claim 16, wherein there are support rings at the ends of said guide tubes and at spaced apart intervals along the length thereof.

18. The assembly of claim 17, wherein there are support rings at the desired points of thermocouple measuring junction locations along the length of said guide tubes.

19. A multipoint thermocouple assembly useful for sensing temperatures at a multiple of points along the length of a hollow well having an interior wall, comprising a plurality of thermocouples insertable into the well and having measuring junctions, guide means including plural axially elongate guideways insertable in the well for guiding respective thermocouples along at least a portion of the length of the well during insertion of said thermocouples in said guideways and when inserted in said well, and means in said guideways for intercepting and urging said measuring junctions of said thermocouples into thermally conductive engagement with respective portions of the interior of the well during insertion of said thermocouples in said guideways when inserted in said well to sense the temperature thereof for temperature measuring purposes.

20. The assembly of claim 19, said means for intercepting and urging comprising plural sloped surfaces positioned in respective guideways for wedging respective measuring ends of said thermocouples into contact with respective wall portions of the well during insertion of said thermocouples in said guideways.

21. The assembly of claim 19, wherein said guideways are in the form of axially elongate guide channels, said guide channels separating respective thermocouples from each other.

22. The assembly of claim 21, said means for intercepting and urging comprising plural sloped surfaces positioned in respective channels at different axially displaced positions for wedging respective measuring junctions of thermocouples into contact with respective axially spaced wall portions of the well.

23. The assembly of claim 22, further comprising mounting means for mounting said guide means while permitting relative movement thereof with respect to the well, and means for effecting such relative movement simultaneously to wedge the measuring junctions of plural thermocouples into engagement with respective wall portions of the well.

24. The assembly of claim 23, further comprising means for holding thermocouples in fixed relation to the well, and wherein said means for effecting relative movement comprises means for moving said guide means axially in the well.

25. The assembly of claim 24, said means for holding comprising means for resiliently urging measuring junctions of thermocouples axially along the well in a direction towards said means for intercepting and urging.

26. The assembly of claim 21, said guide means comprising an elongate tube and said guide channels comprising plural fin means on said tube for spacing said guide means in the well and for forming axial channels extending parallel with the axis of the well.

27. The assembly of claim 21, said guide means comprising an elongate spline tube having axially extending channels in a surface thereof.

28. The assembly of claim 21, further comprising means for attaching together in elongate series relation plural guide means while maintaining the open continuity of said guide channels thereof.

29. The assembly of claim 21, further comprising a junction box having a hollow interior portion for receiving terminal ends of respective thermocouples, and means for connecting said box to the well.

30. The assembly of claim 29, said means for intercepting and urging comprising plural sloped surfaces in respective channels at different axial locations along said guide means, and means for independently mounting said guide means to said box, said means for independently mounting including means for moving said guide means relative to the well in a direction to effect wedging of thermocouple measuring junctions into firm engagement with respective wall portions of the well.

31. The assembly of claim 19, wherein said guideways are formed by guide tubes, said guide tubes separating respective thermocouples from each other and having openings in the outer walls thereof at the desired points of thermocouple measuring junction locations, and said means for intercepting and urging comprising plural sloped surfaces positioned in said guide tubes at said openings for wedging respective measuring ends of thermocouples into contact with said wall portions of the well.

32. The assembly of claim 31, wherein said guide tubes are secured together in a circular array.

33. The assembly of claim 31, wherein said means for urging comprises wedges secured within said guide tubes at such desired points of thermocouple measuring junction locations.

34. The assembly of claim 31, wherein there are a plurality of longitudinally spaced support rings centrally of said guide tubes, said guide tubes being secured to the exterior surface of said support rings.

35. The assembly of claim 34, wherein there are support rings at the ends of said guide tubes and at spaced intervals along the length thereof.

36. The assembly of claim 35, wherein there are support rings at the desired points of thermocouple measuring junction locations along the length of said guide tubes.

37. A multipoint thermocouple assembly comprising a well having an axially elongate hollow interior and an open end, a plurality of thermocouples inserted in said well through said open end and having measuring junctions, guide means including plural axially elongate guideways insertable in the well for guiding respective thermocouples along at least a portion of the length of the well when said thermocouples are inserted into said assembly, means for holding said thermocouples in axially fixed position relative to said well, plural sloped surfaces positioned in respective guideways, and means for mounting said plural sloped surfaces for common axial movement relative to said thermocouples in a direction towards said open end of said well for simultaneously urging respective measuring junctions of said thermocouples into thermally conductive engagement with respective wall portions of said well to senses the temperature thereof.

38. The assembly of claim 37, further comprising means at such open end of the well for effecting such movement of said plural sloped surfaces relative to said thermocouples.

39. The assembly of claim 38, wherein said plural sloped surfaces are fixed for common axial movement to said means for positioning, and said means for effecting includes means for moving said means for positioning axially in said well.

* * * * *